350-6.6 SR XR 2,990,449
CROSS REFERENCE SEARCH ROOM

June 27, 1961 G. VALENSI 2,990,449

COLOR TELEVISION ON PROJECTION SCREEN

Filed June 11, 1959 4 Sheets-Sheet 1

INVENTOR
GEORGES VALENSI
BY Kurt Kelman

2990449
OR IN 358/61

INVENTOR
GEORGES VALENSI
BY Kurt Kelman
AGENT

COLOR TELEVISION ON PROJECTION SCREEN

Filed June 11, 1959 4 Sheets-Sheet 3

INVENTOR
GEORGES VALENSI
BY Kurt Kelman
AGENT

COLOR TELEVISION ON PROJECTION SCREEN

Filed June 11, 1959 4 Sheets-Sheet 4

INVENTOR
GEORGES VALENSI
BY Kurt Kelman
AGENT 2,990,449

COLOR TELEVISION ON PROJECTION SCREEN

Georges Valensi, 3 Rue des Chaudronniers, Geneva, Switzerland

Filed June 11, 1959, Ser. No. 819,726
Claims priority, application France Dec. 31, 1958
7 Claims. (Cl. 178—5.4)

The present invention concerns an improvement of the color television receiving station shown on FIGURE 6 of United States patent application Serial Number 753,693 filed August 7, 1958 and entitled "Color Television"; this station embodies an electronic device adapted to produce on a large projection screen a detailed black and white picture of the scene being scanned at the distant transmitting station, and an electrooptical device made of a powerful source of white light, a color modulator based on electrical birefringence, and a rotating mirror drum, said electrooptical device producing color touches superimposed on said detailed black and white picture. The color modulator shown on said FIGURE 6 of application Serial No. 753,693 comprises two optical polarization stages made of crystal plates of the electrical birefringence type; in the first polarization stage an auxiliary crystal plate produces (between crossed polarizer and analyser) a fixed retardation corresponding to the change from black to pure white, and a plate of ammonium dihydrogen phosphate, across the electrodes of which is applied the color modulating signal; consequently, when said signal is zero, a white luminous flux remains, and therefore the brightness contrast in the non-colored parts of the televised scene is somewhat reduced on the projection screen at the receiving station.

The first object of the present invention is to realize the desired brightness contrast in the non-colored parts of the pictures produced on the projection screen.

The second object of this invention is to realize the desired brightness variations on the parts having a very saturated color.

The third object of this invention is to apply the principle of superposition of color touches on a detailed black and white picture on a projection screen to the color television system of the "National Television Standard Committee" of United States of America, in which a color subcarrier is phase modulated by the "hue" and amplitude modulated by the "degree of saturation" of the color to be reproduced.

Figures 1, 1C:
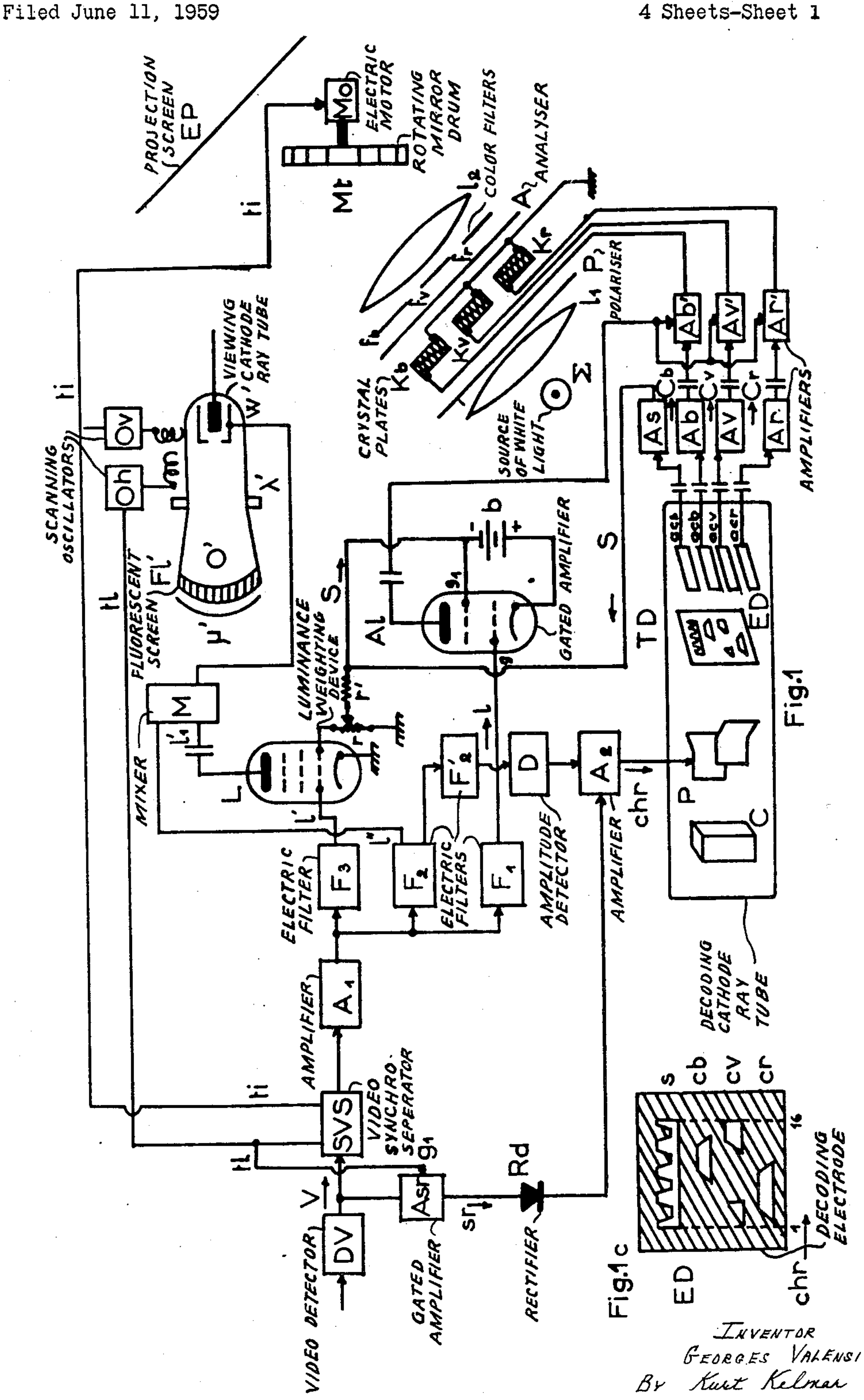
Figure 1D:
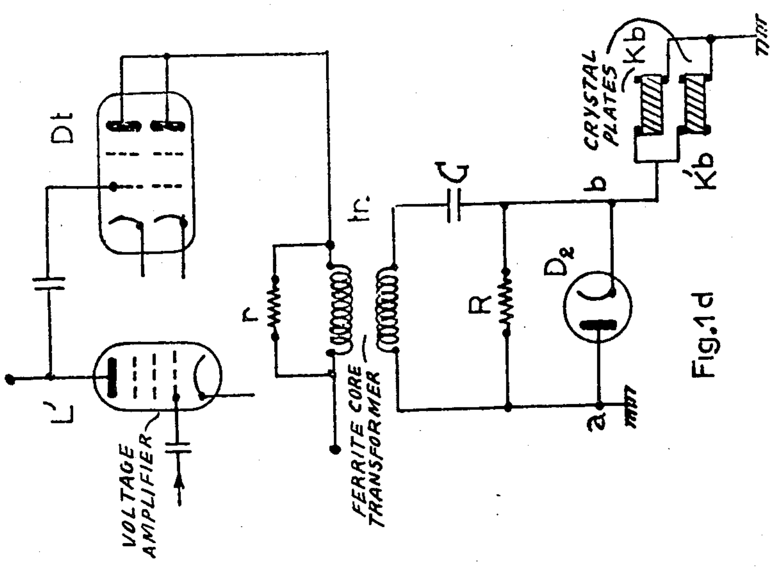
Figure 1B:
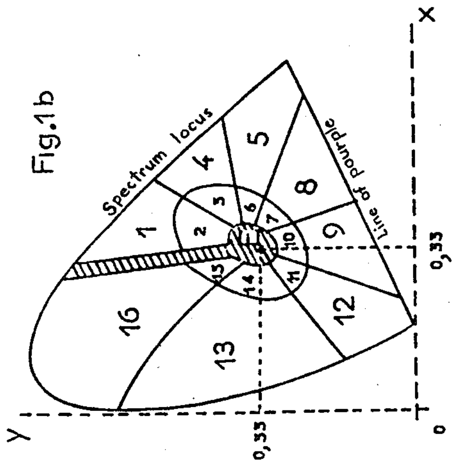
Figure 1A:
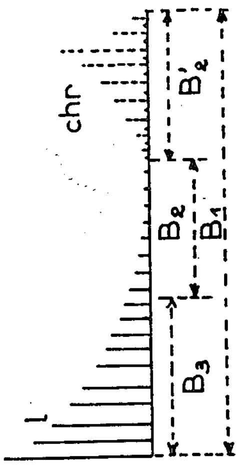
Figures 2, 2D:
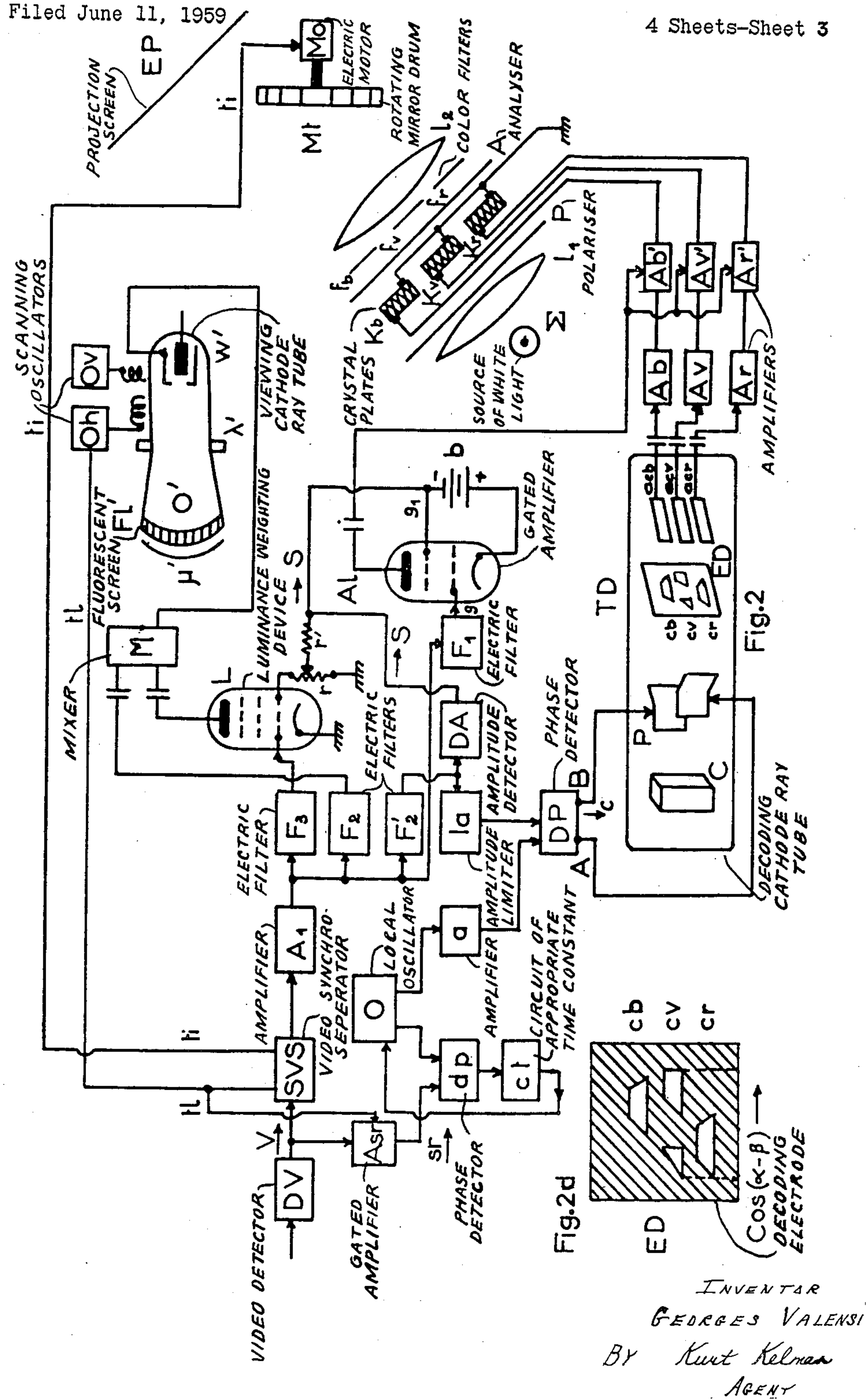
Figures 1E, 2A, 2B, 2C, 3:
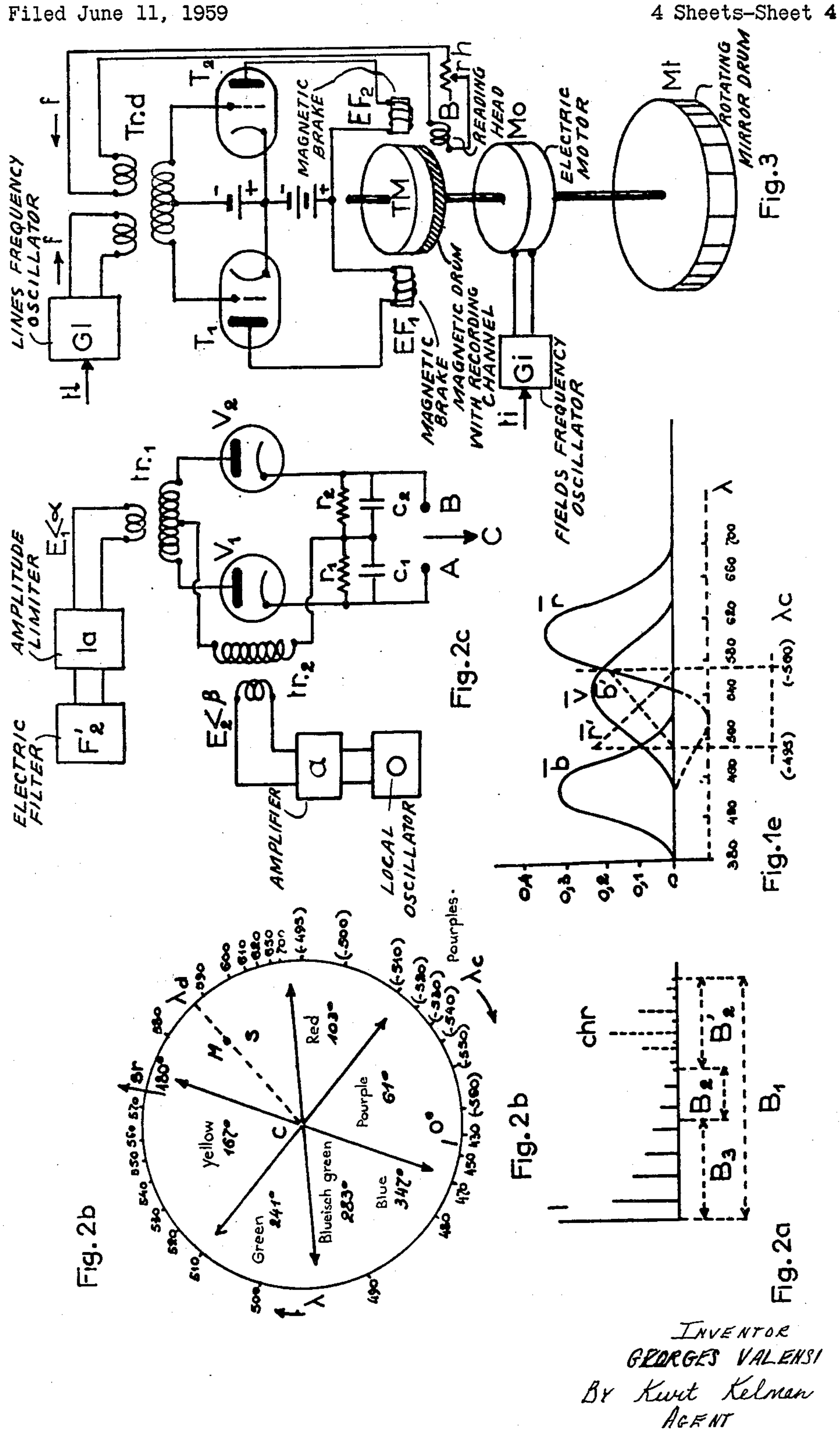

The invention will be better understood in referring to the appended drawings in which:

FIGURE 1 represents schematically the color television receiving station in accordance with the present invention;

FIGURE 1*a* represents the spectrum of the received composite videosignal carrying both the luminance information and the chrominance information, in a color television system based on the mapping of the color triangle;

FIGURE 1*b* represents the color triangle divided in sectors corresponding to various chromaticities that the human eye can distinguish from each other;

FIGURE 1*c* represents the decoding electrode of a cathode ray tube controlled by the received chrominance information and producing, at its output, three primary color signals (blue, green and red) and a signal proportional to the degree of saturation of the color to be reproduced;

FIGURE 1*d* represents the electrical circuit controlling the electrical birefringence of the crystal plates included in the color modulator of FIGURE 1;

FIGURE 1*e* represents the spectral curves of three primary colors;

FIGURE 2 illustrates the application of the principle of the color television receiving station of FIGURE 1 to the color television system of the "National Television Standard Committee" of United States of America;

FIGURE 2*a* represents the spectrum of the received composite video signal in said color television system used in United States of America;

FIGURE 2*b* represents the circular color diagram on which said American color television system is based;

FIGURE 2*c* shows the electrical circuit of a phase detector;

FIGURE 3 shows the synchronizing device applied to the electric motor driving the rotating mirror drum of the color television receiving station of FIGURE 1.

FIGURE 1 assumes that the coding of the color of each elemental area of the scene being scanned at the transmitting station is based on the color triangle shown on FIGURE 1*b*; a "chrominance signal" *chr*, proportional to the number of the sector of the color triangle representing the color to be reproduced, is sent to the distant receiving station, and said chrominance signal *chr* carries both the "hue information" (dominant wave length $\lambda_d$), and the "saturation information" S related to said color. This chrominance signal *chr* modulates the amplitude of a color subcarrier, whereas a "luminance signal" modulates the amplitude of the carrier wave, whereby is obtained the composite videosignal having the spectrum shown on FIGURE 1*a*, the luminance *l* being in solid lines while the chrominance (*chr*) is in dotted lines. The part $B'_2$ of the whole frequency band $B_1$ contains the color subcarrier modulated (in amplitude only) by the chrominance signal *chr*; the band $B_3$ (having the same width as $B'_2$) contains the greatest part of the luminance energy; the band $B_2$ (and to a smaller degree the band $B'_2$) contains the information corresponding to the fine details of the drawing of the transmitted picture.

On FIGURE 1, DV is the video-detector, and EP the projection screen; SVS is the video-synchro-separator which separates the line synchronizing pulses $t_l$ and the field synchronizing signals $t_l$ controlling respectively the oscillator $O_h$ for horizontal scanning (and the oscillator $O_v$ for vertical scanning) of the fluorescent screen $Fl'$ of cathode ray tube O', which projects, on screen EP, a detailed black and white drawing of the scene being scanned at the distant transmitting station, by means of the Schmidt optical system made of spherical mirror $\mu'$ and correcting lens $\lambda'$.

Electric filter $F'_2$ (which separates frequency band $B'_2$ containing the color subcarrier amplitude modulated by the chrominance signal *chr*) feeds the amplitude detector D energizing amplifier $A_2$, the gain of which is automatically regulated by an "amplitude reference signal" *sr* transmitted on the back porch of the line synchronizing pulse $t_l$ at the beginning of each scanning line, said signal *sr* being made of a few periods (with constant amplitude) of the color subcarrier; said signal *sr* (after being separated and amplified by amplifier $A_{sr}$ (passing a very narrow band centered on the color subcarrier frequency, and having a gating grid $g_1$ controlled by the lines synchronizing pulses $t_l$) is rectified by $R_d$, and afterwards controls the gain of amplifier $A_2$; therefore, at the output of said amplifier $A_2$, the "chrominance signal *chr*" is restored with the amplitude it had at the transmitting station, whatever the time variations of the link between the transmitting and receiving stations may be.

The chrominance signal *chr* is applied to the plates P for horizontally deflecting the electronic image of the vertical rectilinear cathode G of decoding cathode rag tube TD and locates said electronic image on a particular vertical line of decoding electrode ED which is provided with 4 slits *s*, $c_b$, $c_v$, $c_r$ (see FIGURE 1*c*). Electrodes *acs, acb, acv* and *acr* (within tube TD) collect the electrons passing through said slits of electrode ED, whereby are obtained (after amplification by means of amplifiers $A_s$, $A_b$, $A_v$, $A_r$) a so-called "saturation signal S" and three so-called "hue signals $C_b$, $C_v$, $C_r$," the instantaneous values of these signals being proportional to the widths of the corresponding slits of electrode ED along the particular vertical line on which the chrominance signal *chr* has placed the electronic image of cathode G. The abcissae (*chr*) on FIGURE 1*c* are proportional to the numbers of the various sectors of the color triangle shown on FIGURE 1*b*, and slits *s*, $c_b$, $c_v$, $c_r$ have appropriate shapes such that signal S is proportional to the desired degree of saturation, and signals $C_b$, $C_v$, $C_r$ have the desired values for the correct control of the electrical birefringence of crystal plates $K_b$, $K_v$, $K_r$ within the color modulator shown on FIGURE 1; these crystal plates are located between the crossed polariser P and analyser A, and are respectively associated with color filters $f_b$, $f_v$, $f_r$ having the selected saturated primary colors blue, green and red; the luminous rays issued from the source of white light Σ (made parallel by lens $l_1$ having its focus at Σ), and passing through crystal plates $K_b$, $K_v$, $K_r$ and color filters $f_b$, $f_v$, $f_r$, are concentrated by lens $l_2$ (after reflection on rotating mirror drum $M_t$ driven by electric motor $M_o$) on a colored spot on projection screen EP, said spot having a saturated color corresponding to the "hue" (dominant wave length) $\lambda_d$ of the chromaticity of the elemental area being scanned at the corresponding transmitting station, as explained hereafter.

The dominant wave-length (or "hue") $\lambda_d$ of a "chromaticity" represented by a certain sector of the color triangle shown on FIGURE 1*b* is read on the millimicron scale along the "spectrum locus" in case of a spectral color, or along the "line of purples" in case of a purple (mixture of blue and red), at the crossing with the straight line joining the center E (coordinates $x=y=0.33$) of the color triangle to the center of the considered sector of said color triangle; the "degree of saturation S" of the considered chromaticity is a function of the distance between point E and the center of said considered sector. For example, on FIGURE 1*b*, the two chromaticities corresponding to sectors Nos. 5 and 6 have the same hue ("red dominant") but have different degrees of saturation (large for sector No. 5 and small for sector No. 6); the chrominance signals corresponding to said two chromaticies being proportional to 5 and to 6 respectively have, however, values close to each other, and this explains why the upper edge of slit *s* in decoding electrode ED (FIGURE 1*c*) has a sinuous shape.

The shapes of slits $c_b$, $c_v$, $c_r$ of decoding electrode ED (FIGURE 1*c*) are based on the following remarks. If, on a beam of parallel luminous rays of white light (produced by a source Σ having an energetic spectral curve represented by a function E (λ) of wave length λ) are inserted a polariser P, a birefringent crystal plate having its principal directions at 45 degrees from said polariser P, and an analyser A crossed with P, and if, after analyser A, is located a color filter $f_o$ having a transparency T (λ) such that only can pass through it the monochromatic radiations of a narrow interval of wave-lengths ($\lambda_o - a_o$, $\lambda_o + a'_o$), the colored part in the light obtained at the output of said filter $f_o$ corresponds to the following expression:

luminous intensity $$I=\frac{1}{a'_o+a_o}\int_{\lambda_o-a_o}^{\lambda_o+a'_o} E(\lambda)\cdot T(\lambda)\cdot \sin^2\frac{\pi\delta}{\lambda}\cdot d\lambda$$

In this expression E(λ) is the luminous intensity at the input of polariser P, and δ is the "path difference" produced by the birefringent crystal plate; $\delta=e(n'-n)$, *e* being the thickness of said crystal plate along the path of the luminous rays, and *n*, *n'* being the refractive indexes of said crystal plate for the two vibrations propagating without distortion through said plate.

If instead of looking directly to the colored luminous flux at the output of color filter $f_o$, the observer looks at the colored spot produced by said flux on a projection screen having a reflectance corresponding to the function R(λ) of wave length λ, the apparent luminous intensity of said color spot on said screen will be, for this observer:

$$I=\frac{1}{a'_o+a_o}\int_{\lambda_o-a_o}^{\lambda_o+a'_o} E(\lambda)\cdot T(\lambda)\cdot R(\lambda)\cdot \sin^2\frac{\pi\delta}{\lambda}\cdot d\lambda$$

In the case of FIGURE 1, the plates $K_b$, $K_v$, $K_r$, located between polariser P and analyser A and associated respectively with color filter $f_b$ (saturated blue), color filter $f_v$ (saturated green) and color filter $f_r$ (saturated red), are crystals having electric birefringence.

For example, use is made of a crystal of ammonium dihydrogen phosphate $NH_4H_2PO_4$ cut perpendicularly to the crystallographic axis, and provided (on its two parallel large faces) with a gold coating in the shape of a ring acting as electrode and through which the luminous rays pass; between these two electrodes is applied an electric voltage V producing a path difference δ; in this case, δ is independent of the thickness *e* of the crystal plate and also of the wavelength λ), and is proportional to electric voltage V in accordance with the following formula:

$$\delta=a\omega^3V=pV$$

ω being the ordinary refractive index and *a* being a constant proper to ammonium dihydrogen phosphate.

If the lengths are expressed in centimeters and the electric voltages in kilovolts, then $a=8.2\,.\,10^{-7}$ cm./kv. The index $\omega=1.5246$. Consequently $p=a\omega^3=27.88\,.\,10^{-7}$.

Color filters $f_b$, $f_v$, $f_r$ of FIGURE 1 are assumed to have very saturated colors, so that practically are obtained:

At the output of filter $f_r$, a monochromatic red light of wave-length $\lambda_r=700.0$ millimicrons,
At the output of filter $f_v$, a monochromatic green light of wave-length $\lambda_v=546.1$ millimicrons,
At the output of filter $f_b$, a monochromatic blue light of wave-length $\lambda_b=435.8$ millimicrons.

If $A_r$, $A_v$, $A_b$ are the values of the function $$A(\lambda)=E(\lambda).T(\lambda).R(\lambda)$$

for the above values $\lambda_r$, $\lambda_v$ and $\lambda_b$ of the wave-length λ, (E(λ) corresponding to source Σ of FIGURE 1, R(λ) corresponding to projection screen EP of FIGURE 1, and T(λ) corresponding to the transparency function of each color filter $f_r$, $f_v$, $f_b$ respectively), if $V_r$, $V_v$, $V_b$ are the electric voltages applied (at a given instant) to the electrodes of plate crystals $K_r$, $K_v$ and $K_b$ of FIGURE 1, then the red, green and the blue luminous fluxes at the output of lens $l_2$ of FIGURE 1 will be respectively equal to:

$$A_r\cdot\sin^2\left(\frac{\pi p V_r}{\lambda_r}\right)\qquad A_v\cdot\sin^2\left(\frac{\pi p V_v}{\lambda_v}\right)\qquad A_b\cdot\sin^2\left(\frac{\pi p V_b}{\lambda_b}\right)$$

For the 3 above monochromatic radiations of wave-lengths $\lambda_r=700.0$ millimicrons (red), $\lambda_v=546.1$ millimicrons (green), and $\lambda_b=435.8$ millimicrons (blue), the curves ($\bar{r}$, $\bar{v}$, $\bar{b}$) of FIGURE 1*e* give the intensity of the flux of each of these 3 radiations to be associated with the intensities of the fluxes of the two others in order to obtain a unit of flux of a monochromatic radiation (spectral color) the wave-length of which is in abcissa on said FIGURE 1*e*, being assumed that the "standard observer" of the International Illumination Committee handles a colorimeter provided with 3 sources of said red, green and blue monochromatic radiations, the spectral radiance on the side "unknown color" of said colorimeter being constant for all wave-lengths; the ordinates ($\bar{r}_d$, $\bar{v}_d$, $\bar{b}_d$) of the curves shown on FIGURE 1*e* for an abcissa $\lambda_d$ (hue of a given chromaticity corresponding to a particular corrected value $(chr)_d$ of the received chrominance signal at the color television receiving station of FIGURE 1) are the proportions of the mixture that said "standard observer" would make in order to realize the colorimetric balance for a monochromatic radiation (very saturated color) of wave-length $\lambda_d$. The negative part of curve $\bar{r}$ is in dotted line because no use can practically be made of it; this constitutes an unavoidable approximation in the reproduction of colors. The straight dotted lines $\bar{b}'$, $\bar{r}'$ on FIGURE 1*e* give the relative proportions of red and blue lights for the various purple colors having a "complementary hue $\lambda_c$" shown in abcissae.

It is now apparent that the electric voltages $V_{rd}$, $V_{vd}$ and $V_{bd}$ to be applied to crystal plates $K_r$, $K_v$, $K_b$ of FIGURE 1 in order that the luminous colored spot produced on projection screen EP be practically monochromatic (very saturated) with a wave-length $\lambda_d$ (or be practically the saturated purple of complementary hue $\lambda_{cd}$), in conformity with a particular value $(chr)_d$ of the received chrominance signal, must be respectively given by the following formulae, $k$ being a constant:

$$k.\bar{r}(\lambda_d)=A_r\cdot\sin^2\left(\frac{\pi_p V_{rd}}{\lambda_r}\right)$$

$$k.\bar{v}(\lambda_d)=A_v\cdot\sin^2\left(\frac{\pi_p V_{vd}}{\lambda_v}\right)$$

$$k.\bar{b}(\lambda_d)=A_b.\sin^2\left(\frac{\pi_p V_{bd}}{\lambda_b}\right)$$

The quantities $\bar{r}(\lambda_d)$, $\bar{v}(\lambda_d)$, $\bar{b}(\lambda_d)$ are numbers read on the scale of ordinates of the curves (solid lines) or the (dotted) straight lines shown on FIGURE 1*e*.

These formulae can also be written as follows:

$$V_{rd}=\frac{\lambda_r}{\pi_p}\cdot\text{arc sin}\sqrt{\frac{k.\bar{r}(\lambda_d)}{A_r}}$$

$$V_{vd}=\frac{\lambda_v}{\pi_p}\cdot\text{arc sin}\sqrt{\frac{k.\bar{v}(\lambda_d)}{A_v}}$$

$$V_{bd}=\frac{\lambda_b}{\pi_p}\cdot\text{arc sin}\sqrt{\frac{k.\bar{b}(\lambda_d)}{A_b}}$$

The widths $l_{rd}$, $l_{vd}$, $l_{bd}$ of the slits $C_r$, $C_v$, $C_b$ of decoding electrode ED (FIGURE 1*c* and FIGURE 1) along the vertical line of abcissa $(chr)_d$ corresponding to a very saturated color (spectral color of wave-length $\lambda_d$, or saturated purple of complementary hue $\lambda_{cd}$) must therefore be proportional to the values $V_{rd}$, $V_{vd}$, $V_{bd}$ given by the above formulae; the design of said decoding electrode ED is based on these formulae with reference to the color triangle shown on FIGURE 1*b*.

As mentioned above, if a voltage V kilovolts is applied to the electrodes of an ammonium dihydrogen phosphate crystal plate (such as $K_r$, $K_v$ or $K_b$ on FIGURE 1), the path difference so obtained is: $\delta=pV$ (with $$p=27.88\ .\ 10^{-7})$$

and the law of variation of the luminous flux obtained at the output of the analyser (crossed with the polariser) is:

$$\sin^2\left(\frac{\pi_p V}{\lambda}\right)$$

this function is equal to one for $pV=\lambda/2$, and is equal to zero for $V=o$.

Therefore, the color modulation fulfilled in accordance with FIGURE 1 requires the following maxima of electric voltages:

For the voltage $V_r$ across the electrodes of crystal plate $K_r$ associated with color filter $f_r$ passing only the monochromatic red radiation of wave-length $\lambda_r=700$ milimicrons$=700\ .\ 10^{-7}$ centimeters, $$V_{r\ max}=\frac{700}{2\times 27.88}=12.55\text{ kilovolts}$$

For the voltage $V_v$ across the electrodes of crystal plate $K_v$ associated with color filter $f_v$ passing only the monochromatic green radiation of wave-length $$\lambda_v=546.1\ .\ 10^{-7}$$

centimeters $$V_{v\ max}=\frac{546.1}{2\times 27.88}=9.79\text{ kilovolts}$$

For the voltage $V_b$ across the electrodes of crystal plate $K_b$ associated with color filter $f_b$ passing only the monochromatic blue radiation of wave-length $\lambda_b$ $$V_{b\ max}=\frac{435.8}{2\times 27.88}=7.82\text{ kilovolts}$$

At the output of each of these color filters, as the variation of the luminous intensity versus applied electric voltage follows a law in square sinus with rather flat maxima, voltages approximating only two thirds of $V_{r\ max}$, $V_{v\ max}$ and $V_{b\ max}$ hereabove will practically be sufficient for obtaining an intense restored light of the desired saturated color.

Moreover, instead of using the single crystal plates ($K_r$, $K_v$, $K_b$) shown on FIGURE 1, use can be made of groups of $n$ crystal plates in series (at the optical viewpoint) and in parallel (at the electrical viewpoint), so that the path differences produced by the various plates in each group add together, while the necessary electric voltage, applied in parallel to the various plates within the same group, can be reduced by a factor $1/\pi$. Such an arrangement is shown on FIGURE 1*d* where 2 crystals $K_b$, $K'_b$ are energized electrically in parallel and are assumed to be located one behind the other along the parallel luminous rays between crossed polariser P and analyser A of FIGURE 1. The optimum number $n$ of crystal plates within each group ($K_r$, $K_v$ or $K_b$ in FIGURE 1) is a compromise between the desire to reduce the electric power necessary for producing the high and rapidly variable voltages modulating the color on one side, and the desire to limit the lack of parallelism of the luminous rays passing successively through the various crystal plates of the same group.

Instead of ammonium dihydrogen phosphate crystal plates (as mentioned above), use can be made of other bodies having electrical birefringence, or magnetic birefringence. For instance monoammonium arseniate $NH_4H_2AsO_4$, or potassium dihydrogen phosphate, or a ferroelectric material such as barium titanite $BaTiO_3$, can be used.

In the case of barium titanite, use can be made either of the transversal, or of the longitudinal electrooptical effect. In the case of the transversal electrooptical effect in barium titanite crystals, an electric voltage V is applied between two electrodes perpendicular to the C axis and distant from each other by $l$, whereas the beam of light (of wave-length $\lambda$) is parallel to the $a$ (or to the $b$) axis, with a path across the crystal equal to $d$. Then the required voltage to change the optical path by $\lambda/2$ for obtaining the maximum light intensity change between crossed polariser and analyser at both sides of the crystal plate is given by the following formula $$V_{\lambda/2}=l\cdot\frac{\lambda/2}{60.10^{-9}.d}\text{ volts}$$

For $\lambda=500$ millimicrons (green light), $d=1$ millimeter and $l=5$ millimeters, $V_{\lambda/2}=2000$ volts, only. If, on the contrary the light is parallel to the electric field (longitudinal electrooptical effect), the voltage $V_{\lambda/2}$ required to give a change of $\lambda/2$ for the optical light path is independent of the thickness of the crystal plate (because $d=l$ in the above formula), and it is easier to apply the electrodes on the large faces of the crystal than to the edges of a thin crystal plate as in the transversal effect case; but, on the other hand, the semi transparent electrodes cut down somewhat the light intensity.

In the case of the transversal electrooptical effect, use can be made of mosaics of thin barium titanite crystal plates aligned along metallic electrodes which support them and energize them in parallel, each mosaic replacing one of the 3 crystal plates shown on FIGURE 1, and some such mosaics being eventually located behind each other along the path of light in order to add together the path differences produced by said mosaics respectively.

In the case of the longitudinal electrooptical effect, instead of one of the crystal plates shown on FIGURE 1, use can be made of one mosaic of barium titanite crystal plates having (on their large faces) semi-transparent electrodes connected in parallel. In order to increase the brightness of the colored touches produced on projection screen EP (FIGURE 1) by the color modulator ($\Sigma$, $l_1$, P, $K_b$, $K_v$, $K_r$, $f_b$, $f_v$, $f_r$, $l_2$), a supplementary lens $l_3$ (not represented on FIGURE 1), having (on its front side) a focus located nearly at the same point as the focus of lens $l_2$, can be inserted between lens $l_2$ and rotating mirror drum $M_t$; this supplementary lens $l_3$ would produce a beam of nearly parallel luminous rays, which, after reflection on said mirror drum $M_t$, provides a bright colored touch on projection screen EP.

The resistance between electrodes of a crystal plate ($K_r$, $K_v$ or $K_b$ on FIGURE 1) being very large, any electric voltage pulse applied to said electrodes should have a very short initial transient part, should be able to maintain the same voltage during a time nearly equal to the duration of one scanning line, and should have also a very short final transient part. In order to fulfill these conditions, use can be made of the electrical circuit shown on FIGURE 1*d* for the last amplifying stage between decoding cathode ray tube TD (FIGURE 1) and the plate crystals $K_b$ (or $K_v$ or $K_r$). This circuit comprises a voltage amplifying pentode L', a double tetrode $D_t$ (having its two parts in parallel), a transformer *tr*, and a diode $D_2$. In the output circuit of tetrode $D_t$ is a resistor *r* in parallel with the inductance of the primary winding of transformer *tr*, said inductance limiting the current intensity in case of a short voltage pulse corresponding to a small colored part of the scene being scanned at the distant transmitting station, whereas resistor *r* limits the current intensity in case of a relatively long voltage pulse corresponding to a large colored part of said scene. At the output of transformer *tr* (between points *a* and *b*, on FIGURE 1*d*) is a capacitor C in series with a resistor R, such that the time constant CR is slightly larger than the duration of a scanning line. Diode $D_2$ (capable of standing voltages of a few thousands of volts) is connected between point *b* and the ground *a* (potential zero). Due to the presence of diode $D_2$, for each colored part of the scene being scanned, a high positive potential, obtained very quickly at the beginning of the corresponding voltage pulse, disappears also very quickly at the end of said pulse.

These voltage pulses occur only when colored parts of the scene at the transmitting station are being scanned. In case of a pure white (or pure black) part of said scene, the chrominance signal (*chr*) is zero (corresponding to the hatched center of the color triangle on FIGURE 1*b*); the hue signals $C_b$, $C_v$ and $C_r$ and the saturation signal S at the output of decoding cathode ray tube TD are also zero, because the electronic image of cathode G is then on the hatched left part of decoding electrode ED (FIGURE 1*c*); therefore there is no colored touch produced by the color modulator ($\Sigma l_1$P, $K_fK_vK_r$, $f_bf_vf_r$, $Al_2$) on projection screen EP.

Only the black and white drawing produced by cathode ray tube O' with fluorescent screen Fl' exists on said projection screen EP. In case of a pure black part of the scene being scanned at the transmitting station, the luminance signal is zero, and the electron pencil is cut off in tube O'; therefore a black part of said drawing is produced. In case of a pure white part of said scene, saturation signal S being zero, the output voltage $l'_1$ of pentode L is maximum; the full luminance ($l'_1+l''$) at the output of mixer M acts on wenhelt cylinder *w'* of tube O'; therefore a pure white part of said drawing is produced in full brightness on said projection screen. This is important because the human eye is very sensitive to a color fault consisting of the apparition of color in a part of the picture which should be white. The scanning lines frequency in the present television standards is maximum in France (20,475 hertz), equal to 15,625 hertz in many European countries, and equal to 15,734 hertz in the American N.T.S.C. color television system. Consequently the lower frequency which must be effectively transmitted through transformer $t_r$ of FIGURE 1*d* is between 15 and 20 kilohertz. Excepting the improbable case of a scene made of squares of alternately two very different chromaticities, and assuming that the width of the frequency band $B'_2$ (FIGURE 1*a*) containing the chrominance information is of the order of magnitude of 1 megahertz, the greater frequency which must be effectively transmitted through transformer $t_r$ of FIGURE 1*d* is of the order 200 kilohertz; such a transformer is of a classical type with a ferrite core.

The gain in electric power consumption realized in using, instead of a single crystal plate (such as $K_b$ on FIGURE 1), a group of plates in series at the optical viewpoint, and in parallel at the electrical viewpoint (such as $K_b$, $K'_b$ on FIGURE 1*d*), is easily demonstrated as follows. If $\Delta V$ is the difference between the two extreme values of a hue signal ($C_b$, $C_v$ or $C_r$), while scanning two juxtaposed parts of respective colors corresponding to sectors No. 1 and No. 16 (FIGURE 1*b*), the maximum color modulating voltage is $\Delta V$ in case of a single crystal plate, and $\Delta V/n$ instead of a group of *n* crystal plates optically in series and electrically in parallel—in order to obtain the same path difference in both cases. Therefore, a smaller number of amplifying stages is sufficient in the case of a group of *n* plates, by comparison with the case of a single plate. Although the current $$\left(G\frac{\Delta V}{\Delta t}\right)$$

necessary to produce, during an interval of time $\Delta t$, a variation of voltage $\Delta V$ across a capacitor of capacity G is greater in case of a group of *n* crystal plates ($G=nc$) than in case of a single crystal ($G=c$), as the capacity *c* of each plate is very small and the resistance between electrodes is very great, there is always ample current carrying capacity in electronic amplifying tubes, and therefore it is a great advantage to reduce the total number of amplifying stages for the color modulation by the use of groups of crystal plates instead of single crystal plates.

In order to obtain a correct reproduction of the colored scene being scanned at the distant transmitting station, use is made (in the receiving station shown on FIGURE 1) of the pentode L acting as "luminance weighting device"; band $B_3$ of the spectrum of the received luminance signal (corresponding to the greatest part $l'$ of the luminance, and separated by electric filter $F_3$) is applied to the control grid of said pentode L, and saturation signal S (produced at the output of decoding cathode ray tube TD) provides to said control grid (through potentiometer *rr'*) a bias such that the output voltage $l'_1$ of pentode L is greater the smaller S (or the degree of saturation of the color to be reproduced) is. Electronic mixer M (FIGURE 1) mixes the output $l'_1$ of pentode L with part $l''$ of the luminance signal (band $B_2$ on FIGURE 1*a*) corresponding to the details of the drawing of the picture to be reproduced; the output of said mixer M controls the wenhelt cylinder *w'* of the cathode ray tube O' with fluorescent screen Fl'. Said screen Fl' (by means of the Schmidt optical system $\lambda'$, $\mu'$) throws, on projection screen EP, a white luminous flux which is great when S is small (case of an unsaturated color to be reproduced) and which is small when S is great (case of a saturated color to be reproduced). To this white light are added the colored touches (saturated colors) produced by the combination of the electrical birefrigences of crystal plates $K_b$, $K_v$, $K_r$ through color filters $f_b$, $f_v$, $f_r$ shown on FIGURE 1. Therefore, the parts of the televised scene having unsaturated colors are well reproduced on projection screen EP with the right relative proportions of color and white.

In the case of a part of the televised scene having a very saturated color, saturation signal S is maximum, the gain of pentode L is reduced, to such an extent that cathode ray tube O′ does not throw any white light on projection screen EP. On the other hand, saturation signal S is then greater than the negative bias (due to battery *b*) of the gating grid $g_1$ of tetrode A*l* (FIGURE 1), so that the plate circuit of said tetrode opens; the control grid *g* of tetrode A*l* is energized by frequency bands $B_3$ and $B_2$ of the luminance spectrum *l*, said bands being separated by electric filter $F_1$. The output of tetrode A*l* controls the gains of amplifiers $A_b'$, $A'_v$, $A_r'$. Therefore the voltages $V_b$, $V_v$, $V_r$ applied to crystal plates $K_b$, $K_v$, $K_r$, while keeping the correct relative proportions corresponding to the hue of the very saturated color to be reproduced, vary simultaneously in accordance with the received luminance signal *l*. Consequently, the relative brightness of the various details within the elemental area of a uniform very saturated color are faithfully reproduced on projection screen EP.

The rotating mirror drum $M_t$ must locate the colored touches produced by the color modulator ($\Sigma$, $l_1$, P, $K_r$, $K_v$, $K_b$, A, $l_2$) at the right places upon the black and white drawing (produced by cathode ray tube O′); therefore the motion of electric motor $M_o$ (driving drum $M_t$) must be correctly synchronized with the scanning of fluorescent screen F*l*′ within cathode ray tube O′.

It is well known that the human eye requires much less chrominance information than details of drawing, and it is for this reason that the chrominance spectrum (band $B'_2$ on FIGURE 1*a*) is much narrower than the whole luminance spectrum (band $B_1$ on FIGURE 1*a*). Consequently drum $M_t$ has, on its periphery, for a given picture a number of mirrors for example four times smaller than the number of scanning lines, said mirrors making progressively increasing angles with the axis of the drum, so that the colored luminous flux (after reflection on said mirrors) scans horizontally only one line of screen EP for four lines of fluorescent screen F*l*′ of tube O′; in the case of interlace scanning for example, line 1 of colored touches on screen EP corresponds to lines 1 and 3 (first field) on screen F*l*′, and also to lines 2 and 4 (second field) on screen F*l*′. The scanning of fluorescent screen F*l*′ of cathode ray tube O′ is controlled in the classical manner by the received lines synchronizing pulses $t_l$ acting on oscillator $O_h$ and by the fields synchronizing signals $t_i$ acting on oscillator $O_v$; FIGURE 3 shows one way of controlling, by means of said pulses $t_l$ and signals $t_i$, the motion of electric motor $M_o$ driving mirror drum $M_t$; the circuit shown on FIGURE 3 contains a differential arrangement of two triodes which may be applied to another way of controlling the motion of mirror drum $M_t$, as hereafter explained.

Referring to FIGURE 3, the received fields synchronizing signals $t_i$ control a generator $G_i$ producing a sine wave at fields frequency feeding the stator of a synchronous motor $M_o$ mechanically connected to mirror drum $M_t$. On the shaft of said motor $M_o$ is a magnetic recording drum TM. Generator $G_l$ produces an alternating current at a frequency *f* equal to (or multiple of) the scanning lines frequency, said generator $G_l$ being controlled by the received lines synchronizing pulses $t_l$.

On one magnetic recording channel of drum TM (represented on FIGURE 3 by the hatched part of the cylindrical surface of TM), the sine wave of frequency *f* has been previously recorded while motor $M_o$ was rotated at its nominal operating speed; therefore, when the device shown on FIGURE 3 is in normal operation, the "reading head" B (in front of which said recording channel moves constantly) produces a voltage at *f* frequency applied through rheostat *rh* to one of the primary windings of differential transformer $T_{rd}$, the other primary winding being energized by generator $G_l$. Rheostat *rh* is adjusted in such a manner that equal currents pass through these two primary windings (having opposite directions) when motor $M_o$ rotates at its nominal speed. The secondary winding of transformer $T_{rd}$ is connected to the control grids of two identical triodes $T_1$ and $T_2$, and the electromagnets $EF_1$, $EF_2$ (located in front of the non hatched part of magnetic drum TM) are inserted in the plate circuits of triodes $T_1$, $T_2$, said electromagnets $EF_1$, $EF_2$ acting as a "magnetic brake" upon drum TM, and consequently also on electric motor $M_o$.

When the two primary currents (at frequency *f*) have opposite phases and equal intensities, triodes $T_1$, $T_2$ do not deliver any current at their output terminals and the "brake" ($EF_1$, $EF_2$) does not operate; when these currents have the same phase, the braking action is maximum; when the phase difference between these two currents varies from 180 to 360 degrees, the braking action varies, sometimes slowing and sometimes accelerating the motion of mirror drum $M_t$.

Another way of using the synchronizing differential device shown at the top of FIGURE 3 is as follows. Instead of a synchronous motor $M_o$, use is made of direct current motor $M_o$ fed by a stabilized direct current source, or preferably use is made of a non-synchronous motor $M_o$, the stator of which is fed by a stabilized source of alternating current, and the rotor of which is a squirrel cage of high electric resistance, said rotor being relatively heavy in order to obtain a great stability of operation; also the speed of the rotor is preferably maintained at a value 50% lower than the speed that a synchronous motor, fed by the same alternating current source, would have. For example, the following orders of magnitudes would be chosen in case of the television standard of many European countries: 625 scanning lines per picture; 25 pictures per second; 50 fields per second (interlaced scanning); aspect ratio of the picture 4/3; 15,625 scanning lines per second; electric power source (feeding the stator of the non-synchronous motor $M_o$), 50 cycles per second. Whereas a synchronous motor fed by said power source would have a speed of 50 revolutions per second, the speed of electric non synchronous motor $M_o$ (FIGURE 3) will have a nominal value of 25 revolutions per second, and will be maintained constantly and exactly at this value by means of a differential electronic device similar to the one shown on top of FIGURE 3. The number of colored touches on projection screen EP being ¼ of the number of scanning lines of fluorescent screen F*l*′ of tube O′ (FIGURE 1), mirror drum $M_t$ should have $$2\times\frac{625}{4}=313$$

mirrors along its periphery; if each mirror is 1 centimeter wide, the diameter of $M_t$ will be $$\frac{313}{3.14}=100$$

centimeters nearly. Considering the speed of 25 revolutions per second, this drum is preferably a solid moulded piece of special steel with high mechanical resistance, the periphery of which has been first well polished, and then coated with a metallic layer in vacuum in order to have a good reflection of the mirrors.

Taking into account the inertia of the assembly "rotor of $M_o$ and mirror drum $M_t$", the resistance of the air, and the braking action of the electronic differential synchronizing device (FIGURE 3), a stability of speed $$\frac{\Delta v}{v}=10^{-4}$$

per second can be obtained. One mirror of drum $M_t$

"sweeps" $25 \times 360 = 9000$ degrees per second; with the above mentioned speed stability, this corresponds to an accidental total angular shift of $$\frac{9000}{10000} = 0.9$$

degree per second. Each mirror can produce $$\frac{313}{2} = 156$$

useful colored touches on projection screen EP, whereas the same number is lost because one line over two is lost on each field; on the other hand, each mirror corresponds to a rotation of $$\frac{360}{313} = 1.15$$

degree of drum $M_t$. Therefore the above mentioned accidental shift corresponds to $$\frac{0.9}{1.15} = 0.77$$

of a line, or to $0.77 \times 156 = 120.12$ colored touches per second. Assuming that this total accidental shift is uniformly distributed on the $50 \times (156 \times \frac{3}{4}) = 5850$ horizontal lines of colored touches to be considered per second, the lack of synchronism between the black and white drawing and the colored touches on projection screen EP would be $$\frac{120}{5850}$$

colored touch per line, which is quite negligible.

As the mirror drum $M_t$ is in steel, it is possible to arrange the electromagnets $EF_1$, $EF_2$ so that they act as a brake on the steel surface of said drum, under the control of the differential electronic device ($T_{rd}$, $T_1$, $T_2$) shown on the top of FIGURE 3. Instead of the magnetic recording drum TM (FIGURE 3) a steel plate wheel provided with, for example, 640 teeth on its circumference will be fixed on the shaft of motor $M_o$, said teeth inducing in coil B an electromotive force at a frequency of $640 \times 25 = 16{,}000$ cycles per second when motor $M_o$ rotates at its normal speed of 25 revolutions per second. This electromotive force feeds one primary winding of transformer $T_{rd}$, while the other winding is fed by $Gl$ at the somewhat smaller scanning lines frequency (15,625 per second); therefore a small braking action is constantly active in the same direction, which is favourable for the stability of operation of the whole mechanism.

Many modifications may be brought into the arrangement shown on FIGURE 1; for example, instead of the cathode ray tube O′ with a fluorescent screen Fl′, use can be made of an "Eidophor" television projector comprising a powerful source of white light (such as an electric arc) illuminating a layer of viscous liquid distorted by the electrostatic forces due to the action of an electron pencil scanning said layer at a speed controlled by the weighted luminance signal at the output of mixer M (FIGURE 1).

Also the principle of color modulation in accordance with the invention may be adapted to any color television system other than the one mentioned above, which is based on the mapping of the color triangle.

For example, FIGURE 2 represents one manner of applying the color modulation process in accordance with the present invention to the color television system designed in United States of America by the National Television Standard Committee ("N.T.S.C. system"). In this case, it is assumed that the scene to be shown at distance is illuminated by "Illuminant G" of the International Illumination Committee (trichromatic coordinates $x_G = 0.310$ and $y_G = 0.316$); the luminous flux emitted by the scanned element of said scene is divided, by means of dichroic mirrors, into three primary fluxes: red R, green V, and blue B—these primary colors having the following trichromatic coordinates:

$$x_R = 0.67 \quad x_V = 0.21 \quad x_B = 0.14$$
$$y_R = 0.33 \quad y_V = 0.71 \quad y_B = 0.08$$

Three cameras receiving these three colored luminous fluxes produce proportional electric voltages ($E_R$, $E_V$, $E_B$) which are applied to non-linear electric networks ("gamma correctors"); at the outputs of these "gamma correctors" (the purpose of which is to compensate, in advance, at the transmitting station, the non-linearity of the viewing cathode ray tube of the distant receiving station), three primary signals are obtained:

$$E'_R = E_R^{-2,2} \qquad E'_V = E_V^{-2,2} \qquad E'_B = E_B^{-2,2}$$

A corrected luminance signal $$E'_y = l^{-2,2} = 0.30E'_R + 0.59E'_V + 0.11E'_B$$

and a chrominance signal $$chr = E'_Q \sin(\text{wst} + 33^0) + E'_I \cos(\text{wst} + 33^0)$$

with $$E'_Q = 0.41(E'_B - E'_Y) + 0.48(E'_R - E'_Y)$$

and $$E'_I = 0.27(E'_B - E'_Y) + 0.74(E'_R - E'_Y)$$

are derived from said primary signals, $\omega_s/2\pi$ being the color subcarrier frequency (3,579,545 sec.$^{-1}$, or 227.5 times the scanning lines frequency, which is equal to 15,734,264 sec.$^{-1}$). The color subcarrier is amplitude and phase modulated by the chrominance signal (*chr*), and this modulated color subcarrier is superimposed upon the luminance signal, so that a composite videosignal V, having the spectrum represented on FIGURE 2*a*, is obtained. On the back porch of each scanning line synchronizing pulses $t_l$ are placed a few periods of the color subcarrier (with constant amplitude) constituting the "color reference signal," or "color burst" *sr*.

Finally, the color of each element of the scene to be shown at distance may be represented by a point M in the circular diagram of FIGURE 2*b*, and is characterized:

(1) By a "hue" (dominant wave-length $\lambda_d$ for spectral colors, or complementary wave-length $\lambda_{cd}$ for purples) read on the millimicrons scale along the circle (which is then both the "spectrum locus" and the "line of purples") at the crossing with the straight line CM joining the center G (representing "Illuminant G") to the considered point M.

(2) By a "degree of saturation" S, which is the relative value of the distance between point M and center G, the length of the radius of the circle being equal to unity.

Practically, the difference between the phase of the chrominance signal (modulated subcarrier) and the phase of the unmodulated subcarrier at the transmitting station characterizes the "hue" of the color to be reproduced, and the amplitude of said modulated subcarrier is proportional to the "degree of saturation" of said color to be reproduced. The color represented by point M on FIGURE 2*b* can also be considered as the mixture of a very saturated color (of wave-length $\lambda_d$, or of complementary wave-length $\lambda_{cd}$) with "Illuminant G" in the proportions of S to (1–S).

In accordance with the present invention, in the case of this American "N.T.S.C. system," at the receiving station represented on FIGURE 2, after the video-detector DV, electrical filters divide the spectrum of the received composite videosignal V (FIGURE 2*a*) in different parts as follows:

$F_1$—frequency bands $B_3$ and $B_2$ containing practically the whole luminance (drawing information);

$F_2$—frequency band $B_2$ concerning only the principal details of the drawing;

$F'_2$—frequency band $B'_2$ containing the whole chrominance, with negligible components of the luminance;

$F_3$—frequency band $B_3$ (having the same width as band $B'_2$) containing the greatest part of the luminance energy.

The video-synchro-separator SVS separates the lines synchronizing pulses $t_l$ and the fields synchronzing signals $t_t$. Amplifier A*sr* (passing a very narrow frequency band centered on the color subcarrier frequency $\omega_s/2\pi$, and having a gating grid controlled by the lines synchronizing pulses $t_l$) separates the "color burst" (color reference signal) *sr*, at the beginning of each scanning line.

Local oscillator O generates a sine-wave at the color subcarrier frequency $\omega_s/2\pi$; the frequency and the phase of said sine-wave are maintained in synchronism with the oscillator generating the color subcarrier at the distant transmitting station in the following manner. The output of oscillator O and the "color burst" *sr* are simultaneously applied to the phase detector *dp*, which (through a circuit *ct* of appropriate time constant) controls the bias of the grid of a reactance tube associated with oscillator O in order to correct any accidental phase shift between local oscillator O and the unmodulated color subcarrier existing at the distant transmitting station.

Consequently the difference of phase between the "color burst *sr*" and the "chrominance signal *chr*" (modulated color subcarrier) obtained at the output of electric filter $F'_2$ (FIGURE 2) is a well determined function of the wave-length ($\lambda_d$ or $\lambda_{cd}$) of the "hue" of the color to be reproduced, this function being determined by the circular diagram of FIGURE 2*b*, on which the following table is based:

| Color to be reproduced | Difference of phase ($\alpha-\beta$) between the received modulated color subcarrier and the "color burst" (Relative values in degrees) | Wave-length of the hue of the color to be reproduced, in millimicrons |
|---|---|---|
| red | 0 | 700 |
| purple | 103−61=42 | (1) |
| blue | 180−(347−283)=116 | 450 |
| bluish-green | 180 | 495 |
| green | 180+42=222 | 510 |
| yellow | 180+116=296 | 575 |

1 Complementary to 510.

On FIGURE 2 (like on FIGURE 1): EP is the projection screen, $A_1$ an electronic amplifier, L a pentode acting as "luminance weighting device," M an electronic mixer, O′ a cathode ray tube with a white fluorescent screen Fl′ associated with a Schmidt optical system $\mu'\lambda'$; $O_h$ and $O_v$ are the oscillators for horizontal and vertical scanning of fluorescent screen Fl′; $M_t$ is the rotating mirror drum driven by electric motor $M_o$ in synchronism with the scanning of fluorescent screen Fl′; Σ is a powerful source of white light. In the color modulator of FIGURE 2, the crystals ($K_b$, $K_v$, $K_r$) having electrical birefringence are associated with color filters ($f_b$, $f_v$, $f_r$) passing only the dominant wave-lengths of the primary colors (blue, green and red) standardized in the American N.T.S.C. color television system and mentioned above: $\lambda_r=610$ millimicrons, $\lambda_v=535$ millimicrons and $\lambda_b=470$ millimicrons.

Amplifier *a*, fed by local oscillator O, produces at its output a wave $E_2\angle\beta$; amplitude limiter *la*, energized by the received modulated color subcarrier (*chr*), separated by electric filter $F'_2$, produces at its output a wave $E_1\angle\alpha$, the amplitude $E_2$ being large by comparison with amplitude $E_1$.

These two waves, $E_1\angle\alpha$ and $E_2\angle\beta$, are applied simultaneously to phase detector DP, the circuit of which is represented on FIGURE 2*c*. By means of transformers $tr_1$ and $tr_2$, the two waves $E_1\angle\alpha$ and $E_2\angle\beta$ energize diodes $V_1$ and $V_2$; at the output terminals (A,B), a wave $G=2E_1\cos(\alpha-\beta)$ (———) (function of the difference of phase ($\alpha-\beta$)) is obtained, and is called hereafter "hue signal G," $E_1$ being maintained constant by amplitude limiter *la*.

Decoding cathode ray tube TD (FIGURE 2) is very similar to tube TD of FIGURE 1, except that its decoding electrode ED has only 3 slits $C_b$, $C_v$, $C_r$ (slit *s* of decoding electrode ED on FIGURE 1 being unnecessary in case of FIGURE 2, as explained hereafter). In fact, as the amplitude modulating the color subcarrier at the transmitting station is proportional to the degree of saturation of the color to be reproduced, it is sufficient to apply (as shown on FIGURE 2) the chrominance signal *chr* (received modulated color subcarrier, isolated by electric filter $F'_2$) to an amplitude detector DA, the desired "saturation signal S" (proportional to the degree of saturation of the color to be reproduced) being so obtained at the output of DA: this saturation signal S provides, to the control grid of pentode L, through potentiometer *rr′*, the desired variable bias, as explained for FIGURE 1 hereabove.

Slits $C_b$, $C_v$, $C_r$ of decoding electrode ED of tube TD (FIGURE 2) are so designed that, when "hue signal" $G=2E_1\cos(\alpha-\beta)$ is applied to deflecting plates P of tube TD, electrodes *acb*, *acv* and *acr* of tube TD collect, behind slits $C_b$, $C_v$ and $C_r$ respectively, electric voltages proportional to the blue, green and red luminous fluxes which (in accordance with a "color mixture diagram" similar to the one shown on FIGURE 1*e*, but corresponding exactly to the hues of the standardized primaries of the N.T.S.C. system) must be mixed together in order to obtain, on projection screen EP, a colored touch of the saturated color having the same dominant wave length as the chromaticity of the elemental area being scanned at the distant transmitting station.

Referring to FIGURE 2*d* (representing the decoding electrode ED of cathode ray tube TD of FIGURE 2), the width of slits $C_b$, $C_v$, $C_r$ along the particular vertical line corresponding to a given value of $\cos(\alpha-\beta)$ (hue signal G) in abcissa should be proportional to the electric voltages $V_{bd}$, $V_{vd}$, $V_{rd}$ given by the following formulae, in which wave-length $\lambda_d$ is read on the millimicrons scale along the circle of FIGURE 2*b* at the crossing with the radius corresponding to a polar angle ($\alpha-\beta$) related to the "color burst" *sr* (see the arrow marked *sr* on FIGURE 2*b*):

$$V_{rd}=\frac{\lambda_r}{\pi_p}\cdot\text{ are sin }\sqrt{\frac{k.\bar{r}(\lambda_d)}{A_r}}$$

$$V_{vd}=\frac{\lambda_v}{\pi_p}\cdot\text{ are sin }\sqrt{\frac{k.\bar{v}(\lambda_d)}{A_v}}$$

$$V_{bd}=\frac{\lambda_b}{\pi_r}\cdot\text{ are sin }\sqrt{\frac{k.\bar{d}(\lambda_d)}{A_b}}$$

$\lambda_r$, $\lambda_v$, $\lambda_b$ are the dominant wave-lengths of the primary colors (red, green and blue) standardized in the N.T.S.C. system.

The numbers $\bar{r}(\lambda_d)$, $\bar{v}(\lambda_d)$ and $\bar{b}(\lambda_d)$ are read on the scale of ordinates for the points of abcissa $\lambda_d$ on curves in solid lines (spectral colors) or on the dotted straight lines (purples) in the above mentioned "color mixture diagram" (similar to the one of FIGURE 1*e*, but corresponding exactly to said N.T.S.C. primaries).

*k* is a constant depending on the nature of the crystal plates ($K_b$, $K_v$, $K_r$, FIGURE 2) having electrical birefringence.

$A_r$, $A_v$, $A_b$ are the values (for $\lambda_r$, $\lambda_v$ and $\lambda_b$ respectively) of the function $A(\lambda)=E(\lambda).T(\lambda).R(\lambda)$, in which $E(\lambda)$ represents the energetic spectral curve of the source Σ of white light (FIGURE 2), $-T(\lambda)$ represents the transparency of the color filter ($f_b$, $f_v$ or $f_r$ on FIGURE 2), $-R(\lambda)$ represents the reflectance of projection screen EP of FIGURE 2.

In the case FIGURE 2 (as for FIGURE 1), saturation signal S is greater than the bias produced by battery *b* on the gating grid $g_1$ of tetrode $Al$ when the elemental area being scanned at the distant transmitting station has a uniform very saturated color on all its surface, but possibly a varying brightness at its various points; in this case, the plate circuit of tetrode $Al$ is opened, and the output voltage of $Al$ controls the grains of amplifier $A_b'$, $A_v'$, $A_r'$ in proportion of the luminance signal separated by electric filter $F_1$ and applied to the control grid of $g$ of $Al$; therefore a colored spot, having the desired saturated color, but presenting at its various points the desired brightness variations, is obtained on projection screen EP.

It is possible to apply in another way the present invention to the American color television system standardized in United States of America (N.T.S.C.) system.

In a classical N.T.S.C. color television receiver, the gamma-corrected primary signals ($E'_B$ blue, $E'_V$ green, $E'_R$ red) and the luminance signal (also gamma-corrected) $E'_Y=0.59E'_V+0.30E'_R+0.11E'_B$ are reproduced.

The red part of $E'_Y$, which is the primary red component of the luminance, is:

$$E'_Y\frac{0.30E'_R}{0.59E'_V+0.30E'_R+0.11E'_B}$$

and the part of $E'_R$ representing the red component of the hue of the color to be reproduced is therefore:

$$\left(E'_R-E'_Y\frac{0.30E'_R}{0.59E'_V+0.30E'_R+0.11E'_B}\right)=(1-0.30)E'_R=0.70E'_R$$

Similarly the parts of $E'_V$ and $E'_B$ representing respectively the green and the blue components of the hue of the color to be reproduced are:

$$(1-0.59)E'_V=0.41E'_V, \text{ and } (1-0.11)E'_B=0.89E'_B$$

In fact, at the distant transmitting station, at the output of the 3 (blue, green and red) cameras, adjustments have been made so that $E'_B$, $E'_V$ and $E'_R$ are equal in case of a white elemental area being scanned on the scene to be shown at distance. On the other hand, the relative radiant energies produced by the materials having blue, green and red fluorescence and constituting the trichrome screen of the viewing tube at the receiving station are very different for equal excitations by the corresponding electron pencils; for this reason, in a N.T.S.C. color television receiver, between the arrangement restoring the primary signals $E'_B$, $E'_V$ and $E'_R$ and the wenhelt cylinders of the 3 electron guns of the viewing tube are inserted three "amplitude correcting networks" so that the real excitations produced by said wenhelt cylinders are in the relations: 100 volts for red, 50 volts for blue and 70 volts for green.

Consequently, taking into account the gamma correction made at the transmitting station, if $\lambda_d$ is the dominant wave-length of the color of the elemental area being scanned at the transmitting station, if $E'_{Rd}$, $E'_{Vd}$, $E'_{Bd}$ are the received gamma-corrected primary signals corresponding to said elemental area, the monochromatic (red, green, blue) luminous fluxes to be mixed together at the receiving station in order that the colored touch produced on projection screen EP (FIGURE 2) has the same saturated color than the hue of said elemental area are very approximately:

For the red ($\lambda_r$=610 millimicrons) $1.0\times0.70E'_R2.2$
For the green ($\lambda_v$=535 milimicrons) $0.70\times0.41E'_V2.2$
For the blue ($\lambda_b$=470 millimicrons) $0.50\times0.89E'_B2.2$ $\lambda_r$, $\lambda_v$, $\lambda_b$ being the dominant wave-lengths of the three colored lights produced by the dichroic mirrors at the N.T.S.C. transmitting station.

Assuming that the color filters $f_r$, $f_v$, $f_b$ (FIGURE 2) associated with crystal plates $K_b$, $K_v$, $K_r$ at the receiving station pass only the monochromatic radiations of wavelengths $\lambda_b$, $\lambda_v$, and $\lambda_r$ respectively, the electric voltages $V_{rd}$, $V_{vd}$, $V_{bd}$ which must be applied across the electrodes of said crystal plates are therefore given by the following formulae:

$$0.70\cdot E'_{Rd}2.2=A_r\cdot\sin^2\left(\frac{\pi_p V_{rd}}{\lambda_r}\right)$$

$$0.70\times0.41\cdot E'_{vd}2.2=A_v\cdot\sin^2\left(\frac{\pi_p V_{vd}}{\lambda_v}\right)$$

$$0.50\times0.89\cdot E'_{Bd}2.2=A_b\cdot\sin^2\left(\frac{\pi_p V_{bd}}{\lambda_b}\right)$$

$A_r$, $A_v$, $A_b$ being the values of the function $$A(\lambda)=E(\lambda).T(\lambda).R(\lambda)$$

for $\lambda=\lambda_r$, $\lambda=\lambda_v$ and $\lambda=\lambda_b$ respectively, $T(\lambda)$ being the transparency of the corresponding color filter ($f_r$, $f_v$ or $f_b$—FIGURE 2), $E(\lambda)$ the spectral curve of source $\Sigma$ of white light, and $R(\lambda)$ the reflectance of projection screen EP.

From the above formulae, the desired approximative values of the electric voltages for modulating the color of the light emitted by source $\Sigma$ are deduced hereafter:

$$V_{rd}=\frac{\lambda_r}{\pi_p}\text{ are sin}\left(\sqrt{\frac{0.70}{A_r}}\cdot E'_{Rd}\right)$$

$$V_{rd}=\frac{\lambda_v}{\pi_p}\text{ are sin}\left(\sqrt{\frac{0.70\times0.41}{A_v}}\cdot E'_{Vd}\right)$$

$$V_{bd}=\frac{\lambda_b}{\pi_p}\text{ are sin}\left(\sqrt{\frac{0.89\times0.50}{A_b}}\cdot E'_{Bd}\right)$$

The second possible way of applying the present invention to the N.T.S.C. color television system is, therefore, to add to the ordinary electrical circuit of the receiving station: (1) an electrooptical device (cathode ray tube with white fluorescent screen, or Eidophor television projector) controlled by the received luminance signal $E'_y$, for projecting (on a large projection screen EP) a detailed black and white picture of the scene being scanned at the distant transmitting station; (2) a pentode L, acting as "luminance weighting device," having its control grid energized by part of the received luminance signal and biased by the detected amplitude of the received color subcarrier; (3) three "formations" cathode ray tubes having vertical rectilinear cathodes, horizontally deflecting plates, decoding electrodes having each a slit, the width of which is determined for each point by the corresponding formula hereabove, and electron collectors behind said slits, the electronic images of said cathodes being located along desired vertical lines of said decoding electrodes under the control of the received primary signals ($E'_{Rd}$, $E'_{Vd}$, $E'_{Bd}$) applied to said horizontally deflective plates; (4) a color modulator comprising a powerful source of white light $\Sigma$ producing a beam of parallel luminous rays passing through a polariser, through crystals having electrical birefringence, and through associated color filters, the output voltages of said three "formations" being respectively applied to the electrodes of said crystals, and (5) an optical system embodying a rotating mirror drum (the motion of which is synchronized with the operation of said electrooptical device producing said black and white picture), for superimposing (on said black and white picture) colored touches made of the light beam produced at the output of said color modulator.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a receiving station for color television on a projection screen on which "colored touches" are superimposed upon a detailed black and white "drawing" of the scene being scanned at the distant transmitting station: a device for generating and locating said colored touches on said screen, comprising: a powerful source of light, a lens at the focus of which said source is located, for producing a beam of parallel luminous rays, a polariser located after said lens, for polarizing said luminous rays in a particular direction of vibration, transparnt bodies locatd across different parts of a plane perpendicular to said luminous rays, and becoming birefringent when electromagnetic fields are applied to them, an opaque suport for holding said bodies in appropriate positions related to said polariser, and for stopping the luminous rays which are not in line with said bodies, color filters located after said bodies and passing only selected primary monochromatic radiations, electrical means controlled by the received chrominance signal, for producing said electromagnetic fields applied to said bodies, an analyser crossed with said polariser and passing only light of a saturated color, the hue of which depends on said electromagnetic fields producing the birefringence of said bodies, an optical system embodying a rotating mirror drum, for concentrating said light of saturated color in a spot scanning said projection screen, and means for synchronizing the motion of said mirror drum with the generation of said detailed black and white drawing, whereby the colored picture of the scene being scanned at the transmitting station is well reproduced on said projection screen.

2. In a color television system in which the color subcarrier is modulated only in amplitude by a chrominance signal carrying information for both the hue and the degree of saturation of the color to be reproduced; and including a device in accordance with claim 1 in which the electrical means controlling the birefringence of said bodies located between the crossed polariser and analyser comprises: a decoding cathode ray tube having a vertical rectilinear cathode, a pair of horizontally deflecting plates energized by said received chrominance signal and a decoding electrode provided with four slits behind which four collecting anodes are located, said deflecting plates locating at a given instant the electronic image of said cathode along a particular vertical line of said decoding electrode where said slits have widths of such values that there are obtained, at the output terminals of said collecting anodes, a saturation signal proportional to the degree of saturation and three hue signals proportional to the primary components of the hue corresponding to the particular chrominance signal applied to said deflecting plates at said instant, a tetrode having a control grid energized by the received luminance signal and a gating gride energized by said saturation signal but negatively biased so that the plate circuit opens only when very saturated colors are to be reproduced, and three amplifiers energized by said three hue signals for controlling the birefringence of said bodies located between crossed polariser and analyser, the gains of the last stages of said amplifiers being controlled by the output of said tetrode.

3. A device in accordance with claim 2 in which said bodies located between the crossed polariser and analyser are constituted each by a group of crystal plates becoming birefringent when electromagnetic fields are applied to them, said plates being optically in series along said beam of parallel luminous rays so that the retardations produced by them add together, and being electrically in parallel across the output terminals of said three amplifiers energized respectively by said three hue signals, whereby the number of stages of said amplifiers can be substantially reduced.

4. In a receiving station of the American N.T.S.C. color television system in which the color subcarrier is amplitude modulated by the degree of saturation of the color to be reproduced and is phase modulated by the hue of said color, and including a device in accordance with claim 1 in which the electrical means controlling the birefringence of said bodies located between crossed polariser and analyser comprises: a local oscillator generating a sinewave of the frequency of said color subcarrier, an arrangement embodying a phase detector energized simultaneously by said local oscillator and by the received color burst, for keeping said local oscillator in phase with the generator of the color subcarrier at the transmitting station, an amplitude detector energized by the received modulated color subcarrier, for producing a saturation signal proportional to the degree of saturation of the color to be reproduced, a second phase detector energized simultaneously by said local oscillator through an amplifier and by said received modulated color subcarrier through an amplitude limiter, for producing a voltage characterizing the hue of the color to be reproduced, a decoding cathode ray tube having a vertical rectilinear cathode, a pair of horizontally deflecting plates energized by the output voltage of said second phase detector and a decoding electrode provided with three slits behind which are located three collecting anodes, said deflecting plates locating at a given instant the electronic image of said cathode along a particular vertical line of said decoding electrode where said slits have widths of such values that said three anodes collect three hue signals proportional to the primary components of the hue of the color to be reproduced at said instant, a tetrode having a control grid energized by the received luminance signal and a gating grid energized by said staturation signal but negatively biased so that the plate circuit opens only when very saturated colors are to be reproduced, and three amplifiers energized by said three hue signals for controlling the birefringence of said bodies located between crossed polariser and analyser, the gains of the last stages of said amplifiers being controlled by the output of said tetrode.

5. In a receiving station of the American N.T.S.C. color television system and including a device in accordance with claim 1 in which the electrical means controlling the birefringence of said bodies located between crossed polariser and analyser comprises: an amplitude detector energized by the received modulated color subcarrier for producing a saturation signal proportional to the degree of saturation of the color to be reproduced, an N.T.S.C. receiving device for restoring the three primary components of the video-signal, means energized by said primary components of producing three hue signals corresponding to the primary monochromatic luminous fluxed to be mixed together in order to obtain the hue of the color to be reproduced, three cathode ray tubes having each a vertical rectilinear cathode, a pair of horizontally deflecting plates and a decoding electrode provided with a slit behind which is located a collecting anode, said deflecting plates being energized respectively by said three hue signals, and said slits having an horizontal rectilinear edge and another edge in shape of the curve representing the arc sinus function, a tetrode having a control grid energized by the received luminance signal and a gating grid energized by said saturation signal but negatively biased so that the plate circuit opens only when very saturated colors are to be reproduced, and three amplifiers energized by the output voltages of said three cathode ray tubes for controlling the birefringence of said bodies located between crossed polariser and analyser, the gains of the last stages of said amplifiers being controlled by the output voltage of said tetrode.

6. A device in accordance with claim 1 in which the means for producing and synchronizing the motion of the mirror drum which superimposes colored touches upon a detailed black and white drawing of the scene being scanned at the transmitting station comprises: a first oscillator controlled by the received fields synchronizing signals, for generating a sine wave at the frequency of said signals, a second oscillator controlled by the received lines synchronizing pulses for generating a sine wave at a frequency $f$ equal to (or multiple of) the frequency of said pulses, a synchronous motor fed by said first oscillator for driving said mirror drum, a magnetic recording drum also driven by said synchronous motor and bearing the magnetic record of a sine wave, a reading head in front of said magnetic record in which a sinusoidal electromotive force at said frequency $f$ is induced when said synchronous motor rotates, a differential arrangement of two identical triodes having their grids energized by the output of said second oscillator and by the output of said reading head, and electromagnets inserted in the plate circuits of said triodes and acting as a magnetic brake on said magnetic recording drum.

7. A device in accordance with claim 1 in which the means for producing and synchronizing the motion or the mirror drum which superimposes colored touches upon a detailed black and white drawing of the scene being scanned at the transmitting station comprises: a stabilized local source of alternating current, a non-synchronous electric motor energized by said local source and having a heavy rotor with a highly resistive squirrel cage, for driving said mirror drum, an oscillator controlled by the received lines synchronizing pulses for generating a sine wave at the frequency $f_1$ of said pulses, a wheel of magnetic material also driven by said motor and having a plurality of teeth along its circumference, a coil, in front of said teeth of said wheel, in which a sine wave of frequency $f_2$ slightly greater than $f_1$ is generated when said motor rotates, a differential arrangement of two identical triodes having their grids energized by said sine waves of frequencies $f_1$ and $f_2$ respectively, and electromagnets inserted in the plate circuits of said triodes and acting as a magnetic brake on said wheel of magnetic material.

No references cited.